(12) United States Patent
Marin et al.

(10) Patent No.: US 7,069,867 B2
(45) Date of Patent: Jul. 4, 2006

(54) PROCESS FOR BURNING SULFUR-CONTAINING FUELS

(75) Inventors: Ovidiu Marin, St. Cloud (FR); Nicolas Perrin, Chicago, IL (US); Pavol Pranda, Lisle, IL (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 10/895,153

(22) Filed: Jul. 20, 2004

(65) Prior Publication Data

US 2005/0178302 A1    Aug. 18, 2005

Related U.S. Application Data

(63) Continuation-in-part of application No. 10/779,474, filed on Feb. 13, 2004.

(60) Provisional application No. 60/558,928, filed on Apr. 2, 2004.

(51) Int. Cl.
*F23D 1/00*   (2006.01)
*F23L 9/00*   (2006.01)

(52) U.S. Cl. ..................... 110/347; 110/348

(58) Field of Classification Search ............ 110/265, 110/297, 348, 342, 343, 344, 345, 346, 347
See application file for complete search history.

(56) References Cited

U.S. PATENT DOCUMENTS

| | | | |
|---|---|---|---|
| 4,201,753 A | 5/1980 | Dayen | |
| 4,226,601 A | 10/1980 | Smith | |
| 4,495,874 A * | 1/1985 | Greskovich et al. | 110/347 |
| 4,519,807 A | 5/1985 | Iketani et al. | |
| 4,523,532 A | 6/1985 | Moriarty | |
| 4,540,554 A | 9/1985 | Dayen | |
| 4,644,879 A | 2/1987 | Grethe et al. | |
| 5,605,452 A | 2/1997 | Robertson et al. | |
| 5,697,307 A | 12/1997 | Nelson et al. | |
| 5,967,061 A | 10/1999 | Ashworth et al. | |

FOREIGN PATENT DOCUMENTS

| | | |
|---|---|---|
| GB | 002294732 | 5/1994 |
| JP | 56098287 | 8/1981 |

OTHER PUBLICATIONS

PCT International Search Report.

\* cited by examiner

*Primary Examiner*—Kenneth Rinehart
(74) *Attorney, Agent, or Firm*—Christopher J. Cronin

(57) ABSTRACT

A process for burning a sulfur-containing fuel to produce a flue gas. The process includes introducing a sulfur-containing fuel into a combustion chamber, introducing an oxidant stream into the combustion chamber and mixing it with the sulfur-containing fuel to define a combustion zone, and introducing potassium carbonate into the combustion chamber. The sulfur-containing fuel is burned to produce the flue gas and potassium sulfate.

25 Claims, 2 Drawing Sheets

PROCESS FOR BURNING SULFUR-CONTAINING FUELS

CROSS REFERENCE TO RELATED APPLICATIONS

This application claims the benefit of U.S. Provisional Application No. 60/558,928, filed Apr. 2, 2004, and a continuation-in-part of U.S. Non-Provisional Application No. 10/779,474, filed Feb. 13, 2004, published as U.S. Ser. No. 2004-0229176 A1. which claims the benefit of U.S. Provisional Application No. 60/460,680. filed Apr. 4, 2003.

BACKGROUND

This invention relates to the field of burning sulfur-containing fuels and to reducing the production of $SO_x$, $NO_x$, unburned carbon, and mercury therefrom.

Over the past several years, power generation processes and other combustion processes for burning sulfur-containing fuels have been subject to increasingly strict emissions restrictions, particularly for $NO_x$ $SO_x$, unburned carbon, and elemental mercury. Sulfur-containing fuels that are popular for power generation but especially problematic for emissions include coal, petcoke and heavy fuel-oil boilers. Current methods of removing $SO_x$ from, e.g., coal fired boilers are very expensive. It is anticipated that within a few years, most of those boilers in the U.S. will require de-sulfurization equipment. $NO_x$, unburned carbon, and elemental mercury removal techniques are similarly expensive, complex and difficult to operate. The preferred embodiments of the present invention disclose cost-effective methods to remove $SO_x$, $NO_x$ as well as unburned carbon and mercury.

Thus, a problem associated with processes for burning sulfur-containing fuels that precede the present invention is that they produce a level of $SO_x$ emission that is unacceptable in view of existing environmental regulations.

Yet another problem associated with processes for burning sulfur-containing fuels that precede the present invention is that they produce a level of $NO_x$ emission that is unacceptable in view of existing environmental regulations.

Still another problem associated with processes for burning sulfur-containing fuels that precede the present invention is that they produce levels of unburned carbon and elemental mercury emissions that are unacceptable in view of existing environmental regulations.

Another problem associated with processes for burning sulfur-containing fuels that precede the present invention is that they have not been successively modified to provide adequate combustion characteristics resulting in adequate reduction of $NO_x$ formation sufficient to meet environmental guidelines without expensive and complex $NO_x$ treatment apparatus.

A further problem associated with processes for burning sulfur-containing fuels that precede the present invention is that they have not been successively modified to provide adequate combustion characteristics resulting in adequate reduction of $SO_x$ formation sufficient to meet environmental guidelines without expensive and complex $SO_x$ treatment apparatus, such as scrubbers, etc.

Another problem associated with processes for burning sulfur-containing fuels that precede the present invention is that they have not been successively modified to provide adequate combustion characteristics resulting in adequate reduction of $NO_x$ formation sufficient to meet environmental guidelines without expensive and complex $NO_x$ treatment apparatus.

An even further problem associated with processes for burning sulfur-containing fuels that precede the present invention is that they have not been provided with a means for chemically preventing the formation of $SO_x$ and concurrently provided with a mechanism to avoid problems associated with slagging or other fouling of the combustion equipment.

Another problem associated with processes for burning sulfur-containing fuels that precede the present invention is that they have not been provided with a means for chemically preventing the formation of $NO_x$ and concurrently provided with a mechanism to avoid problems associated with slagging or other fouling of the combustion equipment.

For the foregoing reasons, there has been defined a long felt and unsolved need for a process for burning sulfur-containing fuels that facilitates an inexpensive, non-intrusive method for reducing the formation of $SO_x$ while at the same time maintaining the operability and safety of the combustion process.

SUMMARY

A process for burning a sulfur-containing fuel to produce a flue gas is disclosed. The process comprises introducing a sulfur-containing fuel into a combustion chamber, introducing at least one oxygen enriched oxidant stream into the combustion chamber, and introducing potassium carbonate into the combustion chamber. The sulfur-containing fuel is burned to produce the flue gas and potassium sulfate.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
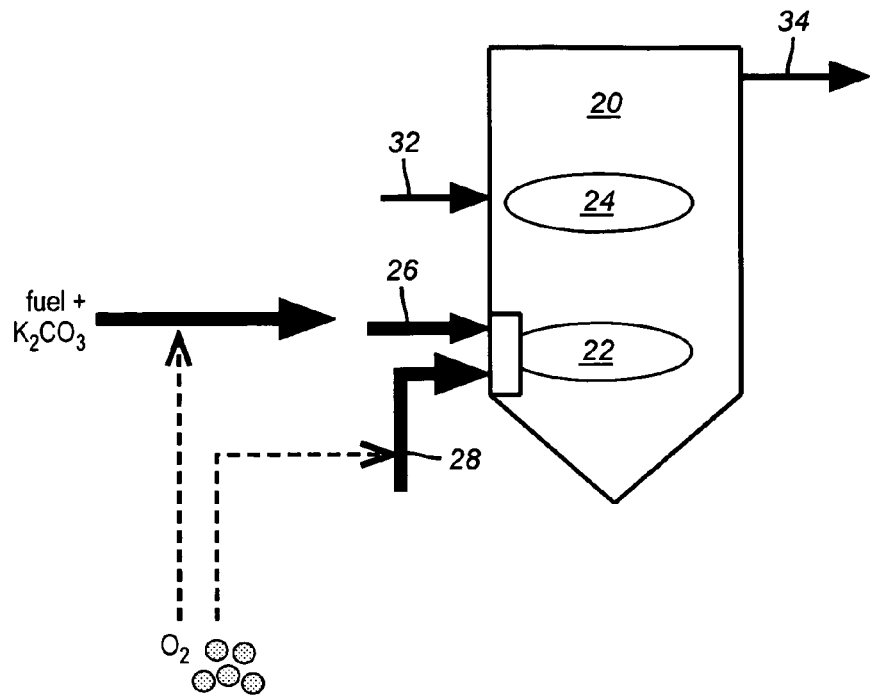
FIG. 1 is a schematic illustration of an embodiment of the invention.

A process for burning a sulfur-containing fuel to produce a flue gas is disclosed. The process comprises introducing a sulfur-containing fuel into a combustion chamber, introducing at least one oxygen enriched oxidant stream into the combustion chamber, and introducing potassium carbonate into the combustion chamber. The sulfur-containing fuel is burned to produce the flue gas and potassium sulfate.

An object of the present invention is to provide a process for burning sulfur-containing fuels that produces a level of $SO_x$ emission that is within acceptable levels in view of existing environmental regulations.

Yet another object of the present invention is to provide a process for burning sulfur-containing fuels that produces a level of $NO_x$ emission that is within acceptable levels in view of existing environmental regulations.

Still another object of the present invention is to provide a process for burning sulfur-containing fuels that can be successively modified to provide adequate combustion characteristics resulting in adequate reduction of $SO_x$ formation sufficient to meet environmental guidelines without expensive and complex $SO_x$ treatment apparatus, such as scrubbers, etc.

Still yet another object of the present invention is to provide a process for burning sulfur-containing fuels that produces levels of unburned carbon and mercury emissions that are within acceptable levels in view of existing environmental regulations.

Another object of the present invention is to provide a process for burning sulfur-containing fuels that can be successively modified to provide adequate combustion characteristics resulting in adequate reduction of $NO_x$ formation sufficient to meet environmental guidelines without expensive and complex $NO_x$ treatment apparatus.

An even further object of the present invention is to provide a process for burning sulfur-containing fuels that provides a means for chemically preventing the formation of $SO_x$ and concurrently provides a mechanism to avoid problems associated with slagging or other fouling of the combustion equipment.

Another object of the present invention is to provide a process for burning sulfur-containing fuels that provides a means for chemically preventing the formation of $NO_x$ and concurrently provides a mechanism to avoid problems associated with slagging or other fouling of the combustion equipment.

These and other objects, advantages and features of the present invention will be apparent from the detailed description that follows.

In its simplest application, a process for burning a sulfur-containing fuel to produce a flue gas is disclosed. The process comprises introducing a sulfur-containing fuel into a combustion chamber, introducing an oxidant stream into the combustion chamber and mixing it with the sulfur-containing fuel to define a combustion zone, and introducing potassium carbonate into the combustion chamber. The sulfur-containing fuel is burned to produce the flue gas and potassium sulfate.

In the preferred embodiments, a combustion subassembly uses at least two, and sometimes three, oxidant streams. In the example in which coal is the sulfur-containing fuel, oxygen enrichment is employed to reduce $NO_x$, as is more fully described in applicant's U.S. patent application Ser. No. 10/758,607, filed 15 Jan. 2004, published as U.S. Ser. No. 2004-0185404 A1. hereby incorporated by reference.

In the preferred embodiments, a process designed to reduce $SO_x$ emissions in boilers, particularly in coal-fired boilers, is disclosed. The process includes introducing potassium carbonate in the combustion process, at the burner level or above the burners. When used in conjunction with oxygen enrichment, $NO_x$ reduction can be achieved, to an even greater degree than is expected by using oxygen enrichment alone. By this process, $SO_x$ levels can be reduced to a few ppm, even for high-sulfur fuels such as Midwestern coals and pet coke. At the same time, the $NO_x$ reducing effect of the oxygen enrichment is enhanced by the potassium carbonate, resulting in a low $NO_x$ process. To avoid slagging effect of the high temperature on the potassium carbonate, a staged combustion process is most preferred.

Laboratory test data illustrates just a portion of the expected benefits in removing sulfur from pet-coke combustion using potassium carbonate. Test results show that the flue gas of both air-combustion (traditional) and oxy-combustion (oxygen enriched) contained approximately 6 ppm $SO_x$. This is extremely low in view of the fact that the pet-coke used contained approximately 3–6% sulfur.

We believe that the series of reactions taking place in the combustion process are:

$$K_2CO_3 \rightarrow K_2O + CO_2 \tag{1}$$

$$K_2O + \tfrac{1}{2}O_2 \rightarrow K_2O_2 \tag{2}$$

$$K_2CO_3 + \tfrac{1}{2}O_2 \rightarrow K_2O_2 + CO_2 \tag{3}$$

$$2K_2O_2 + C_2 \rightarrow K_2O + CO_2 \tag{4}$$

$$3K_2O_2 + 2NO \rightarrow 2K_2O + 2KNO_3 \tag{5}$$

$$K_2O_2 + 2NO_2 \rightarrow 2KNO_3 \tag{6}$$

$$2K_2O_2 + 2SO_2 \rightarrow 2K_2SO_4 \tag{7}$$

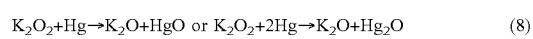

$$K_2O_2 + Hg \rightarrow K_2O + HgO \text{ or } K_2O_2 + 2Hg \rightarrow K_2O + Hg_2O \tag{8}$$

While the kinetics of combustion of sulfur and mercury-containing coal are not well understood, we postulate that the catalytic effects of alkali metal salts on the gasification reactions of carbon appear are best explained by sequences of cyclic redox processes involving reaction of the salts with the carbon substrate and subsequent reoxidation by reaction with the oxidizing gaseous environment. As seen above, we believe that when potassium carbonate is exposed to high temperatures, it leads to formation of highly reactive potassium peroxide which oxidizes $SO_2$, $NO_x$, and unburned carbon resulting in reductions in the levels of $SO_x$, $NO_x$, and unburned carbon.

We also postulate that the high oxidation activity of alkali peroxide is able to oxidize elemental mercury to mercuric oxide, which is soluble in water, and relatively easily removed by water scrubbing.

Recent calculations made of the adsorption of $SO_2$ by $K_2CO_3$ in a pulverized coal boiler fired with Illinois No. 6 coal are illustrated as follows. It was assumed that one million pounds per hour of coal, corresponding to approximately 1000 MW power production, was to be burned with 10% excess air. An elemental composition of the parent coal reveals:

| Element | Wt % daf |
|---|---|
| C | 77.32 |
| H | 5.33 |
| N | 1.49 |
| O | 8.88 |
| S | 6.98 |

It is believed that trace amounts of mercury were also present in the parent coal.

The coal was assumed to have 10% ash, and moisture was neglected. Note that the sulfur composition for this coal is high (approximately 7 wt. % daf). The adsorption rate was assumed to be limited by the diffusion of $SO_2$ to the surface of the particle. The mass transfer rate is:

$$\dot{N}''_{SO2} = h_m(C_{SO2,g} - C_{SO2,s}) \tag{9}$$

where $\dot{N}''_{SO2}$ is the molar flux of $SO_2$ to the particle surface per external surface area of particle, $h_m$ is the convective mass transfer coefficient, and $C_{SO2}$ is the concentration of gas in either the bulk gas phase or at the surface. Under diffusion-limited conditions, $C_{SO2s}$ is essentially zero, and equation (2) becomes very simple. The mass transfer coefficient is calculated from the Sherwood number, which is 2.0 for small particles:

$$Sh = \frac{h_m d_p}{D_{SO2-air}} \tag{10}$$

where $d_p$ is the particle diameter, assumed to be 50 microns in this calculation. The diffusivity of $SO_2$ was calculated from the Chapman-Enskog theory for kinetic gases. The parameters for air were used, since they are similar to post-combustion gases. The diffusivity changes as a function of temperature.

For this calculation, a temperature profile was assumed. The particle and gas temperature started at 2000° K and then decreased in a linear fashion to 1000° K after one second. This is thought to approximate the conditions in most pulverized coal boilers.

The initial concentration of $SO_2$ was calculated from the flow rates of coal and air, assuming that all of the sulfur in the coal ended up as $SO_2$. This yielded a calculation of about 4510 ppm. The differential equation for the change in $SO_2$ concentration in this case is:

$$\frac{dC_{SO2}}{dt} = n_p A_p \dot{N}''_{SO2} \tag{11}$$

where $n_p$ is the particle number density (number of particles per cubic meter), $A_p$ is the external area per particle ($4\pi r_p^2$), and $\dot{N}_{SO2}''$ is from equation (2).

Figure 4:
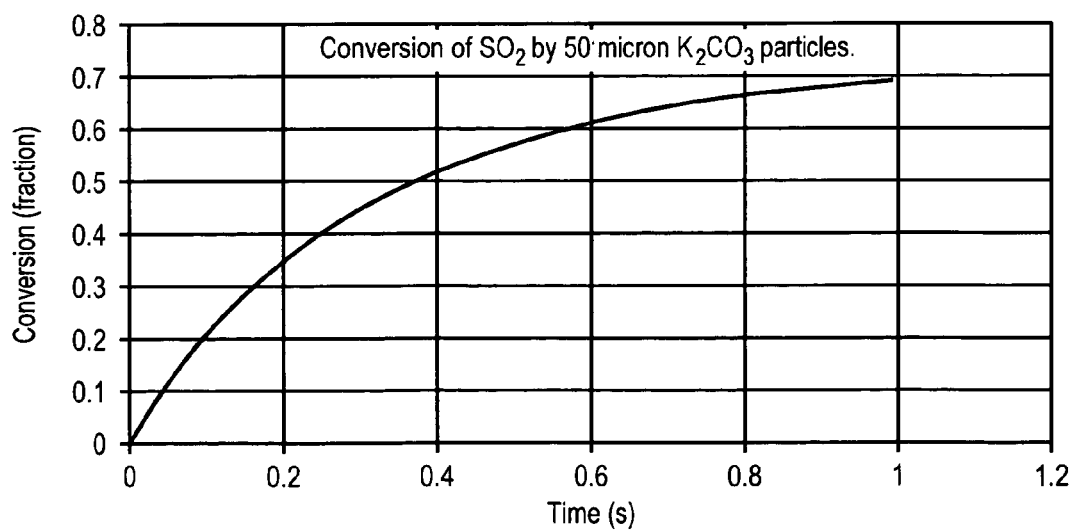
FIG. 4 is a graph illustrating the theoretical data expected from burning a sulfur containing fuel according to a preferred embodiment of the invention.

The resulting $SO_2$ profile is shown in FIG. 4. As shown, the calculations showed only 70% conversion of $SO_2$ to $K_2SO_4$. Actual laboratory data from petroleum coke yield much better results, however. The data indicates a conversion of greater than 95%. Although the reason for the difference is not fully understood, it is believed that perhaps some of the potassium species may have vaporized, which would increase conversion of $SO_2$ (because diffusion to a particle surface would not be necessary).

It is further believed that using $K_2CO_3$ particles will facilitate adsorbing the $SO_2$ from hot post-flame gases. Although, in a preferred embodiment described herein, $K_2CO_3$ is injected with the coal, it is possible that this arrangement will cause the $K_2CO_3$ to become too hot. Excessive temperatures are expected to the $K_2CO_3$ to melt and perhaps become sticky, therefore causing a deposition problem in the combustion chamber. However, because the data seem to indicate that there may have been some vaporization and consequent enhancement in the sulfur conversion to sulfur carbonate, it is possible that the vaporization may be beneficial.

In a more preferred embodiment, the $K_2CO_3$ is injected above the flame zone (primary combustion zone) in order to reduce fouling effects downstream. Thus, in the preferred embodiment illustrated in FIG. 3, potassium carbonate is introduced with the tertiary air, in a second combustion zone. Not only does this arrangement overcome the slagging of potassium carbonate that may occur when it is introduced directly into the flame, it provides an enhanced $NO_x$ reduction. The mechanism by which this $NO_x$ reaction occurs is not fully understood. However, as indicated above, we believe $NO_x$ formation is decreased by the addition of the potassium carbonate, in reactions of the type:

$$3K_2O_2 + 2NO \rightarrow 2K_2O + 2KNO_3 \tag{5}$$

$$K_2O_2 + 2NO_2 \rightarrow 2KNO_3 \tag{6}$$

We also believe that the addition of potassium carbonate, in combination with the oxygen enrichment in this preferred embodiment seems to yield synergistic results.

Figure 2:
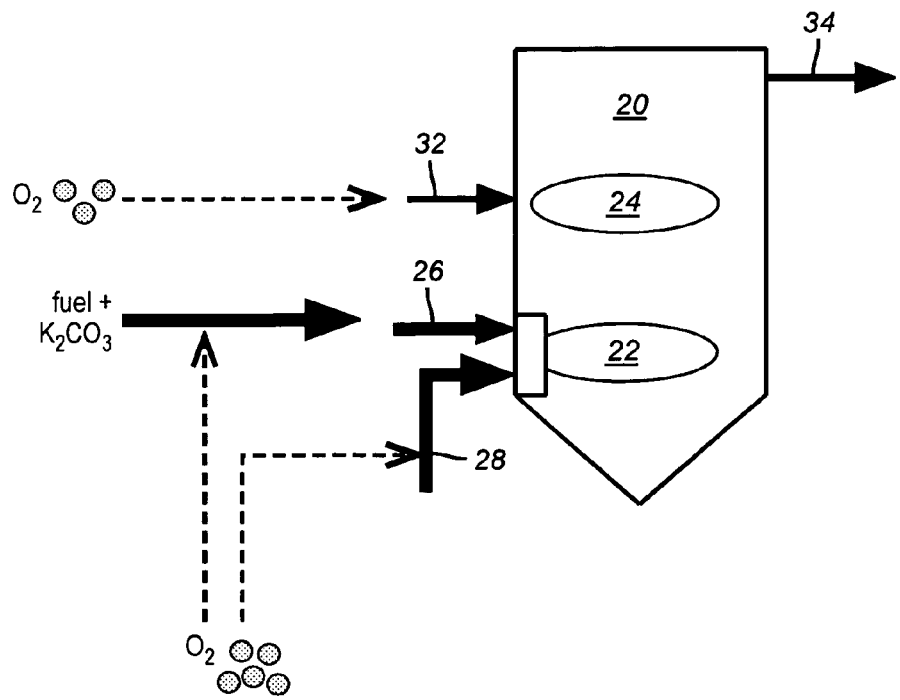
FIG. 2 is a schematic illustration of a second embodiment.
Figure 3:
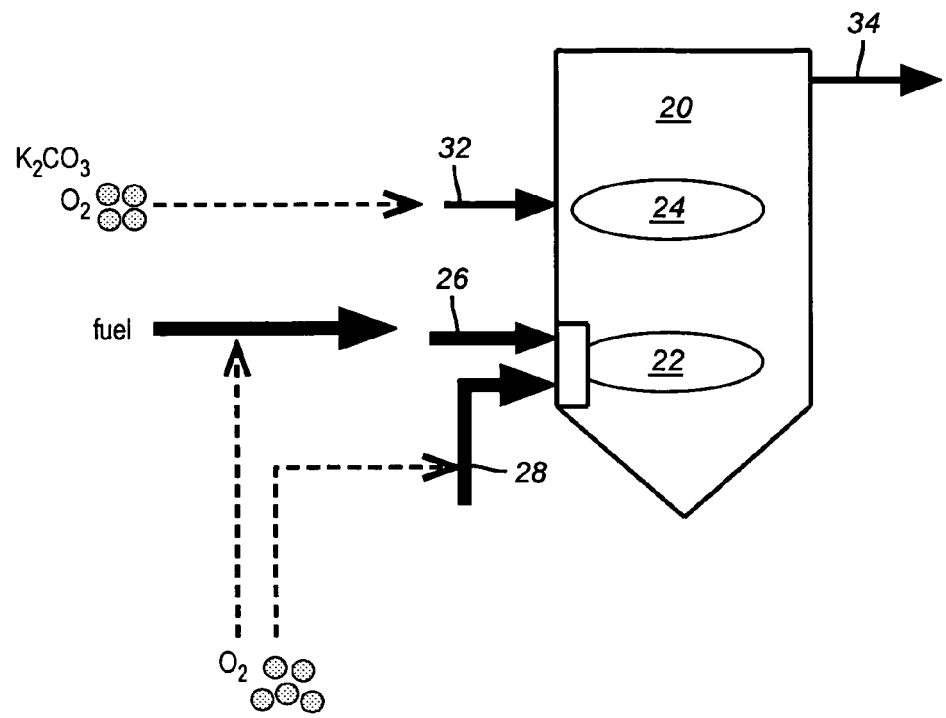
FIG. 3 is a schematic illustration of a third embodiment.

Referring now to FIGS. 1 through 3, three preferred embodiments of a burner are shown in schematic fashion. As shown schematically in FIG. 1, a combustion chamber 20 is shown having a first or primary combustion zone 22 and a second or secondary combustion zone 24. The first of the three inlet streams, the primary stream 26, combines the primary oxidant air with the solid, pulverized fuel, and thereby conveys the pulverized solid fuel into the combustion chamber 20 in the primary combustion zone 22. In an application where the fuel is not solid, the primary inlet stream can be eliminated. The secondary stream 28 introduces the secondary oxidant into the burner, around or near the primary stream 26, and into the primary combustion zone 22. The tertiary stream 32, is injected, if necessary, in the secondary combustion zone 24, to complete combustion. It is understood that in these apparatus, multiple air streams of each type thus described (primary, secondary and tertiary) can be utilized—indeed multiple burners can be used; the following description will refer to each in the singular for simplicity).

As shown in FIG. 1, oxygen enrichment is employed in the primary and secondary oxidant streams, and the potassium carbonate is introduced with the fuel. As shown in FIG. 2, oxygen enrichment is employed in all three oxidant streams, and the potassium carbonate is introduced with the fuel. As shown in FIG. 3, oxygen enrichment is employed in all three oxidant streams, and the potassium carbonate is introduced with the tertiary oxidant into the secondary combustion zone.

Flue gas 34 is formed and exhausted from the combustion chamber 20. Thus, the first combustion zone is the zone where the fuel reacts around the burner level. Secondary zones are sometimes desirable if $O_2$ is provided downstream from the burner before the furnace exit to provide more complete combustion downstream. The oxygen equivalent amount of oxidant is adjusted in the oxidant streams (primary, secondary and, if applicable, tertiary oxidant) to maintain a predetermined amount of excess oxygen in view of the stoichiometric balance needed to complete combustion. This amount of excess oxygen is preferably maintained so that the $O_2$ content of the flue gas is maintained between about 1.5 percent and about 4.5 percent, and more preferably between about 2.5 percent and about 3.5 percent, and most preferably about 3.0 percent. For purposes of this application, all $O_2$ contents are stated by volume of dry gas (excluding $H_2O$).

Thus, the preferred embodiments disclose processes designed to reduce $NO_x$ and $SO_x$ emissions in boilers, particularly in coal-fired boilers. These embodiments comprise introducing potassium carbonate in the combustion process, at the burner level or above the burners, in conjunction with oxygen enrichment. By using this process, the $SO_x$ levels can be reduced to a few ppm, even for high-sulfur fuels such as Midwestern coals and pet coke. At the same time, the $NO_x$ reducing effect of the oxygen enrichment will be significantly enhanced by the potassium carbonate, resulting in a low $NO_x$ process. Due to the slagging effect of the high temperature on the potassium carbonate, a staged combustion process may be preferred. Potassium sulfate can be scrubbed from the flue gas and can be sold as a fertilizer.

FIG. 1 illustrates a first preferred embodiment. The boiler using a solid fuel, such as pet-coke or coal, and utilizes three oxidant streams—primary for fuel transport, secondary for combustion, and tertiary for staged combustion. Note that, as adapted to a liquid fuel-burning apparatus, the primary oxidant stream may be unnecessary.

As shown, the process works to reduce $NO_x$ emissions by controlling temperature at the burner level, and further due to the introduction of the potassium carbonate in the boiler at the same level with the fuel. By controlling the temperature and limiting it from becoming too high, to avoid $NO_x$ production, potassium carbonate slagging will be reduced or perhaps completely avoided. Oxygen is injected at the primary/secondary oxidant level, in order to initiate the combustion process faster and more efficient than with air alone (particularly under fuel-rich conditions).

It is noted that, as less air will be used at the primary/secondary oxidant level, the combustion will be less efficient. Under these circumstances, oxygen offers a clear way to balance this effect, due to the enhanced reactivity when compared to air combustion. Additionally, the presence of the oxygen in the primary combustion zone is even more desirable when low-volatile fuels are implemented, such as anthracite or pet-coke. Finally, the use of an oxygen-enriched oxidant in the primary combustion zone will heat the fuel quicker, and will allow the nitrogen to be released in pure form, rather than being transformed in nitric oxide.

The preferred embodiment illustrated in FIG. 2 shows an alternative process for improving combustion efficiency by improving the oxygen-fuel mixing at the burner level between the fuel and oxidant. In the embodiment of FIG. 2, oxygen enrichment is introduced at the tertiary oxidant level as well, to enhance combustion at the secondary combustion zone.

Referring now to FIG. 3, potassium carbonate is injected into the boiler at the tertiary oxidant level. By injecting the potassium carbonate in the secondary combustion zone, the higher-temperature environment at the burner level is avoided. The potassium carbonate can be injected through the air stream, or even better, through the oxygen stream (where an oxygen lance is used), due to the higher flow velocities, yielding better mixing with the flue gas stream.

Alternately, oxygen can be introduced only at the primary/secondary oxidant level, for $NO_x$ control.

It is preferred that the quantities of potassium carbonate used be selected to comport with the stoichiometry defined by the sulfur content in the fuel. In a preferred embodiment, the potassium carbonate is introduced into the combustion chamber in an amount sufficient to exceed the stoichiometric requirement needed to react with the sulfur in the fuel by between about 0% and about 50%. In a more preferred embodiment, the excess is between about 10% and about 50%. In a most preferred embodiment, the excess is between about 20% and about 35%. As shown by the data, the process results in at least half of the sulfur in the sulfur-containing fuel being converted to potassium sulfate. Oxygen is used such as to replace less than about 10–20% of the overall oxidant, in a relationship between the primary/secondary oxidant stream and tertiary stream such as to minimize the $NO_x$ formation and unburnt fuel in the ash.

Thus, in a preferred embodiment, a process for burning a sulfur-containing fuel to produce a flue gas is disclosed. A sulfur-containing fuel is introduced into a combustion chamber at a fuel inlet. A primary oxidant stream containing more than about 21% oxygen is introduced into the combustion chamber at a primary oxidant inlet positioned proximate to or coincident the fuel inlet and mixing it with the sulfur-containing fuel to define a first combustion zone. A secondary oxidant stream containing more than about 21% oxygen is introduced into the combustion chamber at a secondary oxidant inlet positioned so that the secondary oxidant enters the combustion chamber in the primary combustion zone. A tertiary oxidant stream containing more than 21% oxygen is introduced into the combustion chamber at a tertiary oxidant inlet positioned away from the primary oxidant inlet and away from the secondary oxidant inlet. The tertiary oxidant enters the combustion chamber to define a secondary combustion zone.

The total oxygen content of the oxidant entering the combustion chamber exceeds about 21%. Potassium carbonate is introduced into the combustion chamber through the tertiary air inlet in an amount sufficient to exceed the stoichiometric requirement needed to react with the sulfur in the fuel by between 0% and about 50%. The sulfur-containing fuel is burned to produce the flue gas and potassium sulfate. At least half of the sulfur in the sulfur-containing fuel is converted to potassium sulfate.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for burning a sulfur-containing fuel to produce a flue gas, the process comprising:
   introducing sulfur-containing fuel into a combustion chamber:
   oxygen-enriching an oxidant stream;
   introducing the oxidant stream into the combustion chamber and mixing it with the sulfur-containing fuel to define a combustion zone;
   introducing potassium carbonate into the combustion chamber; and
   burning the sulfur-containing fuel to produce the flue gas and potassium sulfate, wherein the total oxygen content of the oxidant entering the combustion chamber exceeds 21% and the potassium carbonate is introduced into the combustion chamber in an amount sufficient to exceed the stoichiometric requirement needed to react with the sulfur in the fuel by between 0% and 50%.

2. A process for burning a sulfur-containing fuel to produce a flue gas, the process comprising: introducing a sulfur-containing fuel into a combustion chamber;
   oxygen-enriching an oxidant stream;
   introducing the oxidant stream into the combustion chamber and mixing it with the sulfur-containing fuel to define a combustion zone;
   introducing potassium carbonate into the combustion chamber; and
   burning the sulfur-containing fuel to produce the flue gas and potassium sulfate, wherein the total oxygen content of the oxidant entering the combustion chamber exceeds 21% and at least half of the sulfur in the sulfur-containing fuel is converted to potassium sulfate.

3. A process for burning a sulfur-containing fuel to produce a flue gss, the process comprising:
   introducing a sulfur-containing fuel into a combustion chamber at a fuel inlet;

oxygen-enriching at least one-oxidant stream;
introducing a primary oxidant, stream into the combustion chamber at a primary oxidant inlet positioned proximate to or coincident the fuel inlet and mixing it with the sulfur-containing fuel to define a first combustion zone;
introducing a secondary oxidant stream into the combustion chamber at a secondary oxidant inlet positioned so that the secondary oxidant enters the combustion chamber in the primary combustion zone;
introducing potassium carbonate into the combustion chamber, and
burning the sulfur-containing fuel to produce the flue gas and potassium sulfate wherein the total oxygen content of the oxidant entering the combustion chamber exceeds 21% and the potassium carbonate is introduced into the combustion chamber in an amount sufficient to exceed the stoichiometric requirement needed to react with the sulfur in the fuel by between 0% and 50%.

4. A process for burning a sulfur-containing fuel to produce a flue gas, the process comprising:
introducing a sulfur-containing fuel into a combustion chamber at a fuel inlet;
oxygen-enriching at least one oxidant stream;
introducing a primary oxidant stream into the combustion chamber at a primary oxidant inlet positioned proximate to or coincident the fuel inlet and mixing it with the sulfur-containing fuel to define a first combustion zone;
introducing a secondary oxidant stream into the combustion chamber at a secondary oxidant inlet positioned so that the secondary oxidant enters the combustion chamber in the primary combustion zone;
introducing potassium carbonate into the combustion chamber; and
burning the sulfur-containing fuel to produce the flue gas and potassium sulfate wherein the total oxygen content of the oxidant entering the combustion chamber exceeds 21% and at least halt of the sulfur in the sulfur-containing fuel is converted to potassium sulfate.

5. A process for burning a sulfur-containing fuel to produce a flue gas, the process comprising:
introducing a sulfur-containing fuel into a combustion chamber at a fuel inlet;
oxygen-enriching at least one oxidant stream;
introducing a primary oxidant stream into the combustion chamber at a primary oxidant inlet positioned proximate to or coincident the fuel inlet and mixing it with the sulfur-containing fuel to define a first combustion zone;
introducing a secondary oxidant stream into the combustion chamber at a secondary oxidant inlet positioned so that the secondary oxidant enters the combustion chamber in the primary combustion zone;
introducing a tertiary oxidant stream into the combustion chamber at a tertiary oxidant inlet positioned away from the primary oxidant inlet and away from the secondary oxidant inlet, the tertiary oxidant entering the combustion chamber to define a secondary combustion zone;
introducing potassium carbonate into the combustion chamber, and
burning the sulfur-containing fuel to produce the flue gas and potassium sulfate.

6. The process of claim 5 wherein the total oxygen content of the oxidant entering the combustion chamber exceeds 21%.

7. The process of claim 6 wherein the total oxygen content of the primary oxidant exceeds 21%.

8. The process of claim 6 wherein the total oxygen content of the secondary oxidant exceeds 21%.

9. The process of claim 6 wherein the total oxygen content of the tertiary oxidant exceeds 21%.

10. The process of claim 6 wherein at least a portion of the potassium carbonate is introduced into the combustion chamber in the primary combustion zone.

11. The process of claim 6 wherein at least a portion of the potassium carbonate is introduced into the combustion chamber in the secondary combustion zone.

12. The process of claim 6 wherein the potassium carbonate is introduced into the combustion chamber in an amount sufficient to exceed the stoichiometric requirement needed to react with the sulfur in the fuel by between 0% and 50%.

13. The process of claim 6 wherein at least half of the sulfur in the sulfur-containing fuel is converted to potassium sulfate.

14. The process of claim 6 wherein the potassium carbonate is introduced into the combustion chamber through the fuel inlet.

15. The process of claim 14 wherein the total oxygen content of the primary oxidant exceeds 21%.

16. The process of claim 15 wherein the total oxygen content of the secondary oxidant exceeds 21 .

17. The process of claim 16 wherein the total oxygen content of the tertiary oxidant exceeds 21%.

18. The process of claim 6 wherein the potassium carbonate is introduced into the combustion chamber through the tertiary air inlet.

19. The process of claim 18 wherein the total oxygen content of the primary oxidant exceeds 21%.

20. The process of claim 19 wherein the total oxygen content of the secondary oxidant exceeds 21%.

21. The process of claim 20 wherein the total oxygen content of the tertiary oxidant exceeds 21%.

22. The process of claim 21 wherein the potassium carbonate is introduced into the combustion chamber in an amount sufficient to exceed the stoichiometric requirement needed to react with the sulfur in the fuel by between 0% and 50%.

23. The process of claim 21 wherein at least half of the sulfur in the sulfur-containing fuel is converted to potassium sulfate.

24. A process for burning a sulfur-containing fuel to produce a flue gas and ash, the process comprising:
introducing a sulfur-containing fuel into a combustion chamber at a fuel inlet;
introducing a primary oxidant stream containing more than 21% oxygen into the combustion chamber at a primary oxidant inlet positioned proximate to or coincident the fuel inlet and mixing it with the sulfur-containing fuel to define a first combustion zone;
introducing a secondary oxidant stream containing more than 21% oxygen into the combustion chamber at a secondary oxidant inlet positioned so that the secondary oxidant enters the combustion chamber in the primary combustion zone;
introducing a tertiary oxidant stream containing more than 21% oxygen into the combustion chamber at a tertiary oxidant inlet positioned away from the primary oxidant inlet and away from the secondary oxidant inlet, the tertiary oxidant entering the combustion chamber to define a secondary combustion zone;

the total oxygen content of the oxidant entering The combustion chamber exceeding 21%;

introducing potassium carbonate into the combustion chamber through the tertiary air inlet in an amount sufficient to exceed the stoichiometric requirement needed to react with the sulfur in the fuel by between 0% and 50%; and burning the sulfur-containing fuel to produce the flue gas and potassium sulfate; wherein at least half of the sulfur in the sulfur-containing fuel is converted to potassium sulfate.

25. A process for complying with environmental regulations requiring that ash produced by a combustion process contain not more than a predetermined level of carbon and that flue gas produced by the combustion process contain not more than a predetermined level of $SO_x$, the process comprising the steps of:

providing a combustion chamber subject to the environmental regulation;

introducing a sulfur-containing fuel into a combustion chamber;

oxygen-enriching an oxidant stream;

introducing the oxidant stream into the combustion chamber and mixing it with the sulfur-containing fuel to define a combustion zone;

introducing potassium carbonate into the combustion chamber; and burning the sulfur-containing fuel to produce the flue gas and potassium sulfate;

determining a carbon content of the ash; and comparing the determined content to the predetermined level, wherein at least half of the sulfur in the sulfur-containing fuel is converted to potassium sulfate.

* * * * *

UNITED STATES PATENT AND TRADEMARK OFFICE
CERTIFICATE OF CORRECTION

| | |
|---|---|
| PATENT NO. | : 7,069,867 B2 |
| APPLICATION NO. | : 10/895153 |
| DATED | : July 4, 2006 |
| INVENTOR(S) | : Marin et al. |

It is certified that error appears in the above-identified patent and that said Letters Patent is hereby corrected as shown below:

In column 8, Claim 1, line 35, please insert --a-- after the word "introducing".

In column 8, Claim 3, Line 65, please replace the text "gss" with the word --gas--.

In column 9, Claim 3, line 2, please delete "oxidant," and insert the word --oxidant--.

In column 9, Claim 4, line 39, please delete the word "halt" and replace with --half--.

In column 11, Claim 24, line 3, please delete "The" and replace with --the--.

Signed and Sealed this

Seventeenth Day of October, 2006

JON W. DUDAS
*Director of the United States Patent and Trademark Office*